United States Patent
Yamada et al.

(10) Patent No.: US 9,477,081 B2
(45) Date of Patent: Oct. 25, 2016

(54) IMAGING LENS AND IMAGING APPARATUS

(71) Applicant: FUJIFILM Corporation, Tokyo (JP)

(72) Inventors: Hiroshi Yamada, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 28 days.

(21) Appl. No.: 14/694,192

(22) Filed: Apr. 23, 2015

(65) Prior Publication Data

US 2015/0234181 A1    Aug. 20, 2015

Related U.S. Application Data

(63) Continuation of application No. PCT/JP2013/006050, filed on Oct. 10, 2013.

(30) Foreign Application Priority Data

Oct. 31, 2012   (JP) ................. 2012-239818

(51) Int. Cl.
*G02B 9/04* (2006.01)
*G02B 27/00* (2006.01)
*G02B 9/64* (2006.01)
*G02B 13/18* (2006.01)
*G02B 13/04* (2006.01)

(52) U.S. Cl.
CPC ............. *G02B 27/0025* (2013.01); *G02B 9/64* (2013.01); *G02B 13/04* (2013.01); *G02B 13/18* (2013.01)

(58) Field of Classification Search
CPC .. G02B 27/0025; G02B 13/18; G02B 13/04; G02B 9/64; G02B 6/04; G02B 9/08; G02B 9/06; G02B 9/10
See application file for complete search history.

(56) References Cited

U.S. PATENT DOCUMENTS

| | | | |
|---|---|---|---|
| 2005/0219715 A1* | 10/2005 | Kimura | G02B 13/06 359/749 |
| 2006/0050406 A1 | 3/2006 | Ishii | |
| 2010/0208367 A1 | 8/2010 | Sugita | |
| 2011/0109974 A1 | 5/2011 | Sato | |
| 2014/0192421 A1 | 7/2014 | Sato | |

FOREIGN PATENT DOCUMENTS

| | | |
|---|---|---|
| JP | 2005-316398 | 11/2005 |
| JP | 2006-078535 | 3/2006 |
| JP | 2008-145586 | 6/2008 |
| JP | 2008-170720 | 7/2008 |
| JP | 2010-191077 | 9/2010 |
| JP | 2011-102863 | 5/2011 |

OTHER PUBLICATIONS

International Search Report, PCT/JP2013/006050, Feb. 25, 2014.

* cited by examiner

*Primary Examiner* — Joseph P Martinez
(74) *Attorney, Agent, or Firm* — Young & Thompson

(57) ABSTRACT

An imaging lens, consisting of a first lens group, a top, and a second lens group having a positive refractive power, in order from the object side, in which the first lens group is composed of a first front lens group having a negative refractive power and a first rear lens group having a positive refractive power in order from the object side, the first rear lens group is composed of a cemented lens formed of a negative lens and a positive lens, the first front lens group at least includes four negative lenses, and at least two of the negative lenses included in the first front lens group satisfy a conditional expression given below:

$$70 < \nu d1n \quad (1).$$

20 Claims, 6 Drawing Sheets

EXAMPLE 1

FIG.1 EXAMPLE 1
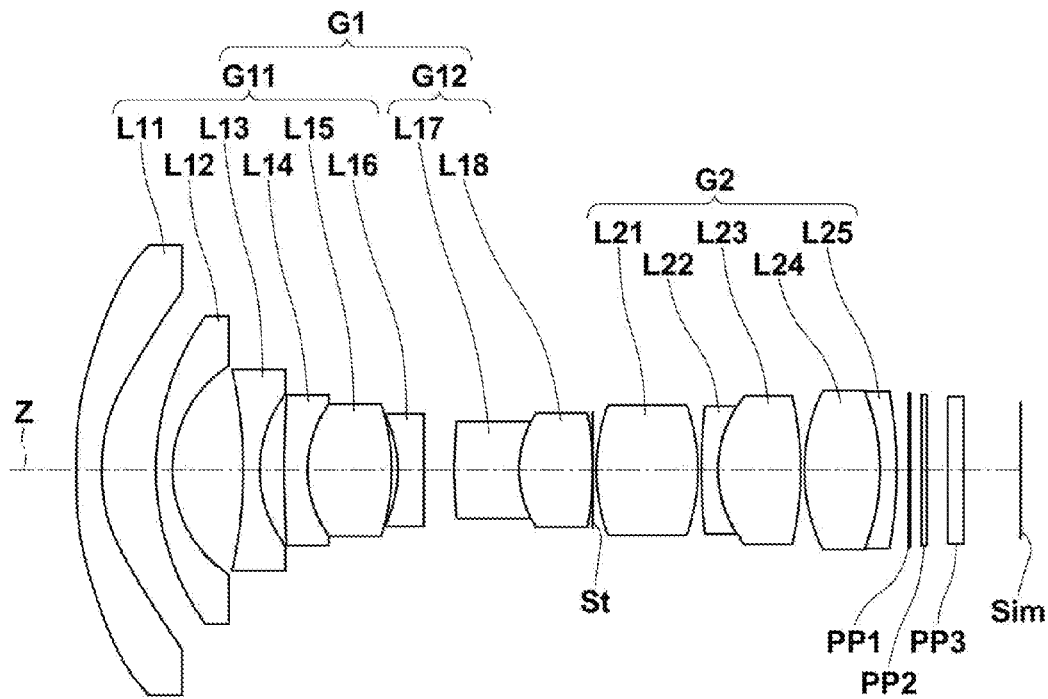
FIG.2 EXAMPLE 2
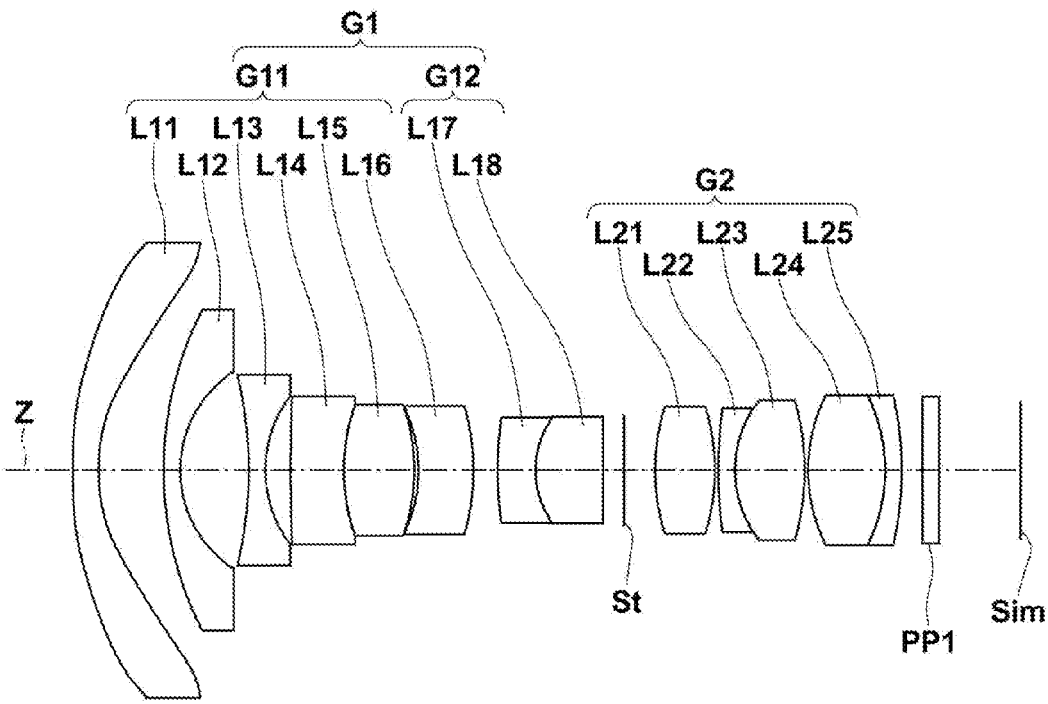

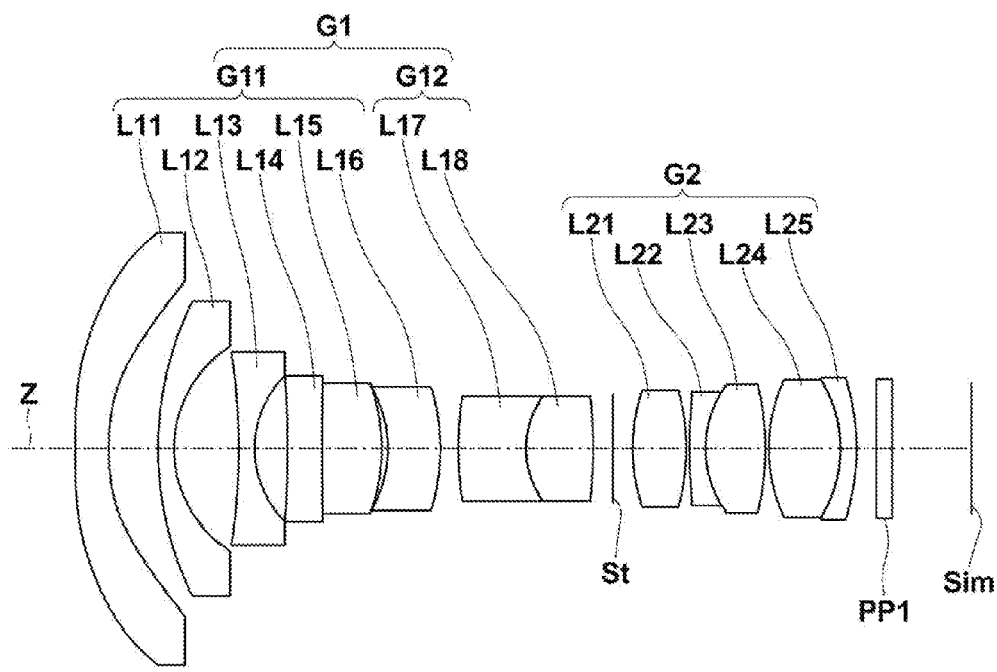
FIG.3  EXAMPLE 3
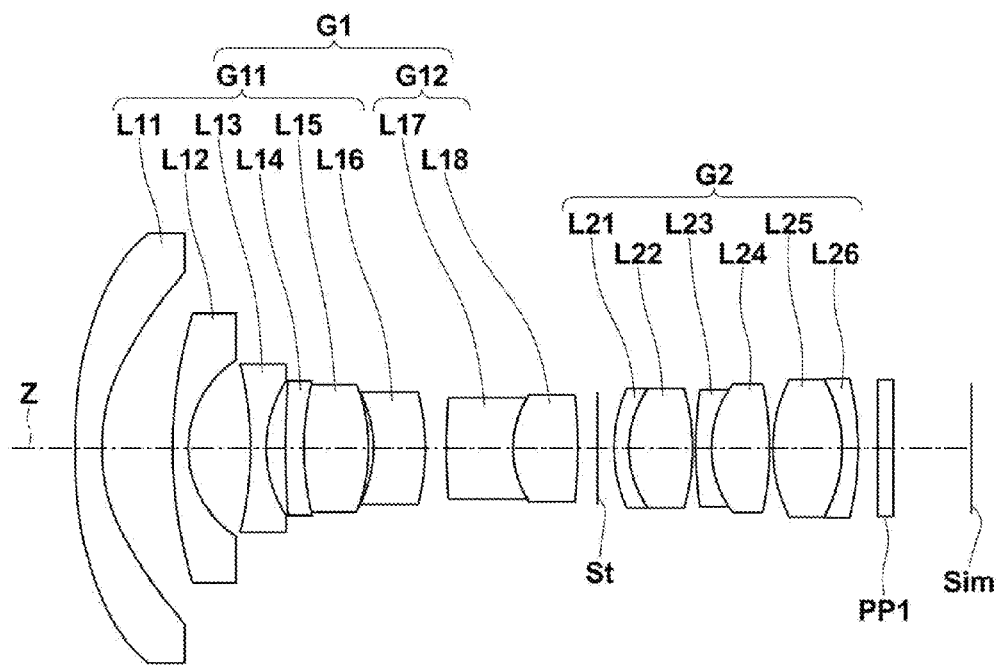
FIG.4  EXAMPLE 4

EXAMPLE 5

EXAMPLE 1

DISTANCE : INF

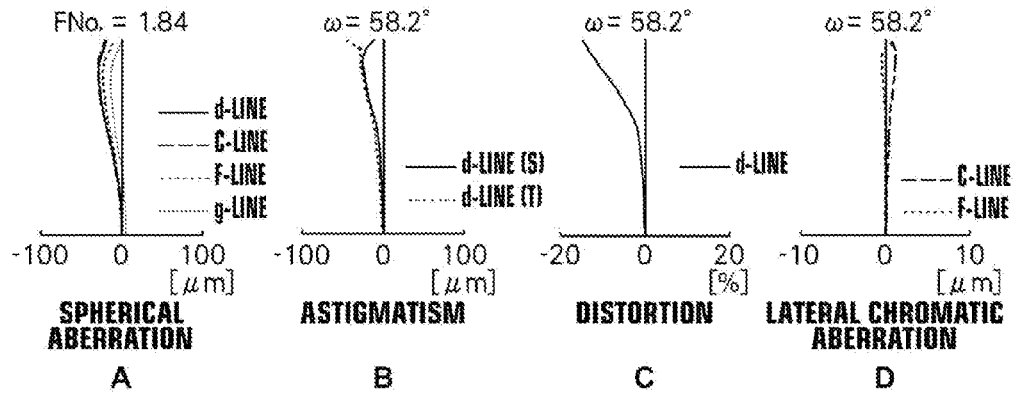
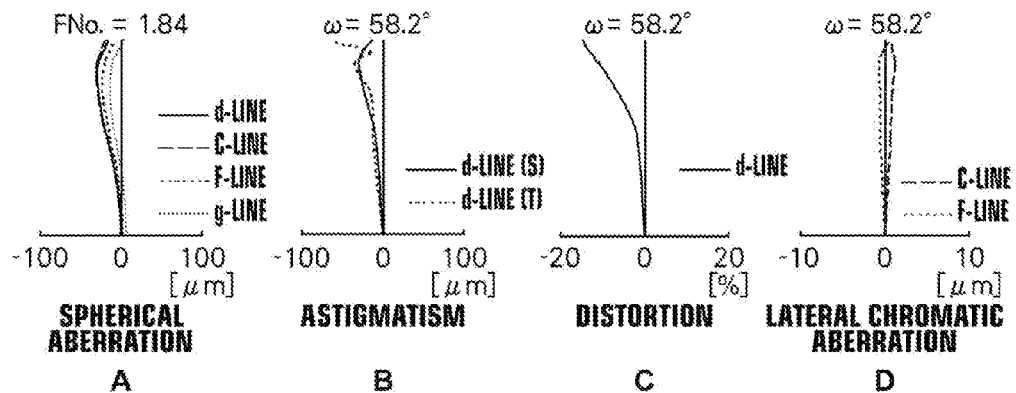

IMAGING LENS AND IMAGING APPARATUS

CROSS-REFERENCE TO RELATED APPLICATIONS

This application is a Continuation of PCT International Application No. PCT/JP2013/006050 filed on Oct. 10, 2013, which claims priority under 35 U.S.C. §119 (a) to Japanese Patent Application No. 2012-239818 filed on Oct. 31, 2012. Each of the above applications is hereby expressly incorporated by reference, in its entirety, into the present application.

BACKGROUND OF THE INVENTION

1. Technical Field

The present invention relates to an imaging lens and an imaging apparatus, and more specifically to an imaging lens used in electronic cameras, such as digital cameras, surveillance cameras, and the like, and an imaging apparatus equipped with the imaging lens.

2. Background Art

As imaging lenses used in imaging devices, including video cameras and electronic still cameras, that use image sensors as the recording media, such as a CCD (Charge Coupled Device), a CMOS (Complementary Metal Oxide Semiconductor), and the like, those described, for example, in Japanese Unexamined Patent Publication No. 2008-145586, Japanese Unexamined Patent Publication No. 2011-102863, and Japanese Unexamined Patent Publication No. 2005-316398 have been proposed.

SUMMARY OF INVENTION

The trend towards high pixel counts in digital cameras and surveillance cameras has recently been advanced, and ultra-wide-angle lenses are also required to have higher resolving powers. In surveillance cameras, lenses having small F-numbers, that is, so-called bright lenses are required for nighttime monitoring.

But, in the imaging lens described in Japanese Unexamined Patent Publication No. 2008-145586, the correction of spherical aberration and astigmatism is inadequate. Further, the imaging lens described in Japanese Unexamined Patent Publication No. 2011-102863 is dark with an FNo. of 4.1. Still further, in the imaging lens described in Japanese Unexamined Patent Publication No. 2005-316398, the correction of lateral chromatic aberration is inadequate.

The present invention has been developed in view of the circumstances described above, and it is an object of the present invention to provide an imaging lens having a small FNo. with satisfactorily corrected aberrations, and an imaging apparatus equipped with the lens.

A first imaging lens of the present invention consists of a first lens group, a stop, and a second lens group having a positive refractive power, in order from the object side, wherein the first lens group is composed of a first front lens group having a negative refractive power and a first rear lens group having a positive refractive power, in order from the object side, the first front lens group at least includes four negative lenses and at least two of the negative lenses included in the first front lens group satisfy a conditional expression (1) given below, and the first rear lens group is composed of a cemented lens formed of a negative lens and a positive lens and satisfies a conditional expression (4) given below, in which $vd1n$: Abbe number of the lens concerned with respect to the d-line, T12: thickness of the first rear lens group on the optical axis, and f: focal length of the entire system:

$$70 < vd1n \quad (1)$$

$$1.5 < T12/f < 5 \quad (4).$$

A second imaging lens of the present invention consists of a first lens group, a stop, and a second lens group having a positive refractive power, in order from the object side, wherein the first lens group is composed of a first front lens group having a negative refractive power and a first rear lens group having a positive refractive power, in order from the object side, the first front lens group is composed, in order from the object side, of three negative lenses, each with a surface smaller than that of the object side in absolute value of radius of curvature on the image side, and a cemented lens formed of a negative lens and a positive lens in order from the object side, and at least two of the negative lenses included in the first front lens group satisfy a conditional expression (1) given below, the first rear lens group is composed of a cemented lens formed of a negative lens and a positive lens, and at least one surface of the most object side lens in the second lens group is aspherical, in which $vd1n$: Abbe number of the lens concerned with respect to the d-line:

$$70 < vd1n \quad (1).$$

Preferably, in the imaging lens of the present invention, the second lens group includes two pairs of cemented lenses adjacently disposed in order from the most image side, each being formed of a negative lens and a positive lens, and each cemented lens satisfies a conditional expression given below, in which $\Delta vd2c$: difference in Abbe number between the positive and negative lenses forming the cemented lens (Abbe number of the positive lens−Abbe number of the negative lens):

$$35 < \Delta vd2c \quad (2).$$

Preferably, the second lens group includes at least two pairs of cemented lenses, each being formed of a negative lens and a positive lens, and each cemented lens satisfies a conditional expression given below, in which $\Delta N2C$: difference in refractive index between the negative and positive lenses forming the cemented lens with respect to the d-line (refractive index of the negative lens−refractive index of the positive lens):

$$0.35 < \Delta N2C \quad (3).$$

Still further, the imaging lens preferably satisfies a conditional expression given below, in which f1: focal length of the first lens group and f2: focal length of the second lens group:

$$-2 < f2/f1 < 0 \quad (5).$$

Further, both surfaces of the most object side lens in the first front lens group are preferably aspherical.

The first front lens group may be composed of three negative lenses, each with a surface smaller than that of the object side in absolute value of radius of curvature on the image side, a cemented lens formed of a negative lens and a positive lens in order from the object side, and a negative meniscus lens with a concave surface on the object side, in order from the object side.

Still further, the imaging lens preferably satisfies a conditional expression given below:

$$80 < vd1n \quad (1-1).$$

Preferably, the second lens group includes two pairs of cemented lenses adjacently disposed in order from the most image side, each being formed of a negative lens and a positive lens, and each cemented lens satisfies a conditional expression given below:

$$40<\Delta vd2c \qquad (2\text{-}1).$$

Further, the second lens group preferably includes at least two pairs of cemented lenses, each being formed of a negative lens and a positive lens, and each cemented lens satisfies a conditional expression given below:

$$0.38<\Delta N2C \qquad (3\text{-}1).$$

Still further, the first rear lens group preferably satisfies a conditional expression given below:

$$2<T12/f<4.5 \qquad (4\text{-}1).$$

Further, the imaging lens preferably satisfies a conditional expression given below:

$$-1.5<f2/f1<0 \qquad (5\text{-}1).$$

An imaging apparatus of the present invention is equipped with the foregoing imaging lens of the present invention.

The imaging lens of the present invention consists of a first lens group, a stop, and a second lens group having a positive refractive power, in order from the object side, wherein the first lens group is composed of a first front lens group having a negative refractive power and a first rear lens group having a positive refractive power, in order from the object side, the first rear lens group is composed of a cemented lens formed of a negative lens and a positive lens, the first front lens group at least includes four negative lenses, and at least two of the negative lenses included in the first front lens group satisfy a conditional expression given below. This allows the imaging lens of the present invention to have a small FNo. with satisfactorily corrected aberrations:

$$70<vd1n \qquad (1).$$

Further, as the imaging apparatus of the present invention is equipped with the imaging lens of the present invention, bright and high-quality images may be obtained.

BRIEF DESCRIPTION OF THE DRAWINGS

FIG. 1 is a cross-sectional view of an imaging lens according to one embodiment of the present invention (common to Example 1), illustrating a lens configuration thereof.

FIG. 2 is a cross-sectional view of an imaging lens of Example 2, illustrating a lens configuration thereof.

FIG. 3 is a cross-sectional view of an imaging lens of Example 3, illustrating a lens configuration thereof.

FIG. 4 is a cross-sectional view of an imaging lens of Example 4, illustrating a lens configuration thereof.

FIG. 7 shows each aberration diagram of imaging lens of Example 2 of the present invention (A to D).

FIG. 8 shows each aberration diagram of imaging lens of Example 3 of the present invention (A to D).

DESCRIPTION OF EMBODIMENTS

Figures 5, 6:
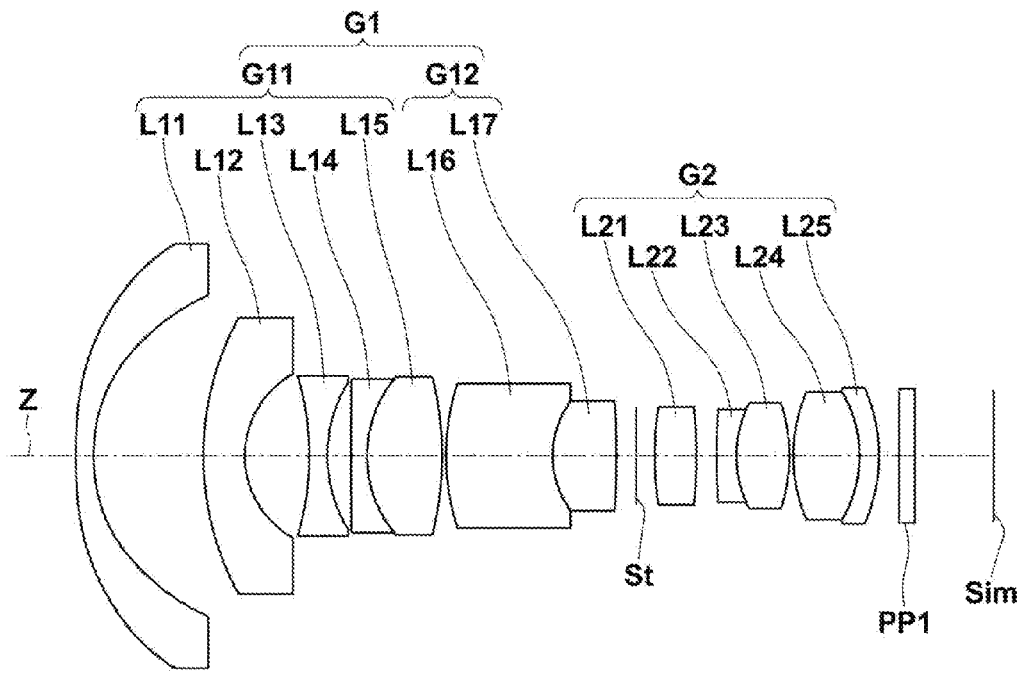
FIG. 5 is a cross-sectional view of an imaging lens of Example 5, illustrating a lens configuration thereof.
FIG. 6 shows each aberration diagram of imaging lens of Example 1 of the present invention (A to D).

Hereinafter, embodiments of the present invention will be described in detail with reference to the accompanying drawings. FIG. 1 is a cross-sectional view of an imaging lens according to one embodiment of the present invention (common to Example 1), illustrating a lens configuration thereof. The configuration example shown in FIG. 1 is common to the configuration of an imaging lens of Example 1, to be described later. In FIG. 1, the left side is the object side and the right side is the image side.

The foregoing imaging lens consists of a first lens group G1, an aperture stop St, and a second lens group G2 having a positive refractive power, in order from the object side along the optical axis Z. Note that the aperture stop St in FIG. 1 does not necessarily represent the size or the shape thereof, but the position on the optical axis Z.

As it is preferable, in applying the imaging lens to an imaging apparatus, to dispose a cover glass, a prism, and various types of filters, such as an infrared cut filter, a low-pass filter, and the like, between the optical system and the image plane Sim according to the camera side structure to which the lens is attached, FIG. 1 shows an example in which parallel plate-like optical members PP1, PP2, and PP3 assuming these are disposed between the second lens group G2 and the image plane Sim.

The first lens group G1 is composed of a first front lens group G11 having a negative refractive power and a first rear lens group G12 having a positive refractive power, in order from the object side.

The first front lens group G11 is configured to at least includes four negative lenses and at least two of the negative lenses included in the first front lens group G11 satisfy a conditional expression (1) given below, in which vd1n: Abbe number of the lens concerned with respect to the d-line:

$$70<vd1n \qquad (1).$$

The first rear lens group G12 is composed of a cemented lens formed of a negative lens L17 and a positive lens L18.

In this way, the employment of a retrofocus configuration in which the first front lens group G11 is negative, the first rear lens groups G12 is positive, and the second lens group G2 is positive allows the angle of view to be increased easily. The disposition of the first rear lens group G12 having a positive refractive power in front of the aperture stop St is advantageous for correcting lateral chromatic aberration which is likely to occur in retrofocus. The distribution of the positive refractive power between the first rear lens group G12 and the second lens group G2 is advantageous for reducing the FNo.

The distribution of the negative refractive power among the four or more negative lenses is advantageous for suppressing distortion and astigmatism, while maintaining a wide angle.

Further, the satisfaction of the conditional expression (1) is advantageous for suppressing lateral chromatic aberration generated in the first front lens group G11 to the outermost angle.

In a case where the imaging lens is configured to satisfy a conditional expression (1-1) given below, the imaging lens may have more favorable characteristics:

$$80<vd1n \qquad (1\text{-}1).$$

Preferably, in the imaging lens of the present invention, the second lens group G2 includes two pairs of cemented lenses adjacently disposed in order from the most image side, each being formed of a negative lens and a positive lens, and each cemented lens satisfies a conditional expression (2) given below, in which Δvd2c: difference in Abbe number between the positive and negative lenses forming the cemented lens (Abbe number of the positive lens−Abbe number of the negative lens):

$$35 < \Delta vd2c \qquad (2).$$

The disposition of the cemented lens that satisfies the conditional expression (2) on the back side of the aperture stop allows the lateral chromatic aberration generated in the first front lens group G11 to be cancelled. Further, the disposition of two pairs of cemented lenses adjacently disposed in order from the most image side allows aberrations after inversion of the outermost angle to be reduced, while suppressing lateral chromatic aberration at a low angle of view.

In a case where the imaging lens is configured to satisfy a conditional expression (2-1) given below, the imaging lens may have more favorable characteristics:

$$40 < \Delta vd2c \qquad (2\text{-}1).$$

Preferably, the second lens group G2 includes at least two pairs of cemented lenses, each being formed of a negative lens and a positive lens, and each cemented lens satisfies a conditional expression (3) given below, in which ΔN2C: difference in refractive index between the negative and positive lenses forming the cemented lens with respect to the d-line (refractive index of the negative lens−refractive index of the positive lens):

$$0.35 < \Delta N2C \qquad (3).$$

The disposition of the cemented lens that satisfies the conditional expression (3) allows the over-corrected Petzval sum which is likely to occur by the heavy use of a low-dispersion material in the first front lens group G11 to be cancelled, which is advantageous for correcting field curvature, while suppressing astigmatism. It is also advantageous for correcting spherical aberration. The use of at least two pairs of cemented lenses allows astigmatism to be suppressed to the outermost angle, thereby preventing higher order spherical aberrations and allowing a small FNo. to be realized easily.

In a case where the imaging lens is configured to satisfy a conditional expression (3-1) given below, the imaging lens may have more favorable characteristics:

$$0.38 < \Delta N2C \qquad (3\text{-}1).$$

Further, the first rear lens group G12 preferably satisfies a conditional expression (4) given below, in which T12: thickness of the first rear lens group on the optical axis, and f: focal length of the entire system:

$$1.5 < T12/f < 5 \qquad (4).$$

If the first rear lens group G12 falls below the lower limit of the conditional expression (4), the first rear lens group will have a disadvantage in correcting distortion and astigmatism. Conversely, if the first rear lens group G12 exceeds the upper limit of the conditional expression (4), the first front lens group G11 will result in a large diameter.

In a case where the imaging lens is configured to satisfy a conditional expression (4-1) given below, the imaging lens may have more favorable characteristics:

$$2 < T12/f < 4.5 \qquad (4\text{-}1).$$

Further, the imaging lens preferably satisfies a conditional expression (5) given below, in which f1: focal length of the first lens group G1 and f2: focal length of the second lens group (G2):

$$-2 < f2/f1 < 0 \qquad (5).$$

If the imaging lens falls below the lower limit of the conditional expression (5), the imaging lens will have a disadvantage in correcting spherical aberration, causing a difficulty in realizing a small FNo. Conversely, if the imaging lens exceeds the upper limit of the conditional expression (5), the imaging lens will have a disadvantage in securing required back focus.

In a case where the imaging lens is configured to satisfy a conditional expression (5-1) given below, the imaging lens may have more favorable characteristics:

$$-1.5 < f2/f1 < 0 \qquad (5\text{-}1).$$

Preferably, both surfaces of the most object side lens L11 in the first front lens group G11 are aspherical. This allows generation of various types of aberrations, including distortion, to be suppressed, while giving a strong negative refractive power to the first front lens group G11.

Still further, the first front lens group G11 may be composed of three negative lenses L11 to L13, each with a surface smaller than that of the object side in absolute value of radius of curvature on the image side, a cemented lens formed of a negative lens L14 and a positive lens L15 in order from the object side, and a negative meniscus lens L16 with a concave surface on the object side, in order from the object side (aspects of Examples 1 to 4, to be described later: FIGS. 1 to 4). In this way, with respect to the object side three negative lenses L11 to L13, directing a surface smaller than that of the object side in absolute value of radius of curvature on the image side is advantageous for correcting distortion and astigmatism. The subsequent disposition of the cemented lens formed of the negative lens L14 and the positive lens L15 in order from the object side allows control of higher order chromatic aberrations. The subsequent disposition of the negative meniscus lens L16 with a concave surface on the object side allows spherical aberration to be corrected easily.

Further, the first front lens group G11 may be composed of three negative lenses L11 to L13, each with a surface smaller than that of the object side in absolute value of radius of curvature on the image side, and a cemented lens formed of a negative lens L14 and a positive lens L15 in order from the object side, and at least one surface of the most object side lens L21 in the second lens group G2 is formed aspherical (aspect of Example 5, to be described later: FIG. 5). In this way, with respect to the object side three negative lenses L11 to L13, directing a surface smaller than that of the object side in absolute value of radius of curvature on the image side is advantageous for correcting distortion and astigmatism. The subsequent disposition of the cemented lens formed of the negative lens L14 and the positive lens L15 in order from the object side facilitates control of various types of aberrations. Further, the aspherical formation of at least one surface of the most object side lens L21 in the second lens group G2 allows spherical aberration to be corrected easily without complicating the configuration of the first front lens group G11.

As a specific material disposed on the most object side in the present imaging lens, glass is preferably used, or otherwise transparent ceramics may be used.

In a case where the present imaging lens is used under a severe environment, a multilayer film coating is preferably applied for protection. Further, other than the protection coating, an antireflection coating may be applied for reducing ghost light when the imaging lens is used or similar purposes.

FIG. 1 shows an example in which the optical members PP1, PP2, and PP3 are disposed between the lens system and the image plane Sim, but instead of disposing a low-pass filter, various filters that cut specific wavelength ranges, and the like between the lens system and the image plane Sim, foregoing various filters may be disposed between each lens or a coating having an identical effect to that of each filter may be applied to a lens surface of any lens.

Next, numerical examples of the imaging lens of the present invention will be described.

An imaging lens of Example 1 will be described first. A cross-sectional view illustrating a lens configuration of the imaging lens of Example 1 is shown in FIG. 1. FIG. 1 and FIGS. 2 to 5 corresponding to Examples 2 to 5, to be described later, also illustrate optical members PP1, PP2, and PP3, in which the left side is the object side and the right side is the image side, and the illustrated aperture stop St is not necessarily represents the size or the shape thereof but indicates the position on the optical axis Z.

The imaging lens of Example 1 consists of a first lens group G1, an aperture stop St, and a second lens group G2 having a positive refractive power, in order from the object side.

The first lens group G1 is composed of a first front lens group G11 having a negative refractive power and a first rear lens group G12 having a positive refractive power, in order from the object side. The first front lens group G11 is composed of a negative meniscus lens L11 with a concave surface on the image side, a negative meniscus lens L12 with a concave surface on the image side, a biconcave lens L13 with a surface smaller in absolute value of radius of curvature on the image side, a cemented lens formed of a negative meniscus lens L14 with a concave surface on the image side and a biconvex lens L15 in order from the object side, and a negative meniscus lens L16 with a concave surface on the object side, in order from the object side. The first rear lens group G12 is composed of a cemented lens formed of a negative meniscus lens L17 with a concave surface on the image side and a biconvex lens L18 in order from the object side.

The second lens group G2 is composed, in order from the object side, of a biconvex lens L21, a cemented lens formed of a negative meniscus lens L22 with a concave surface on the image side and a biconvex lens L23 in order from the object side, and a cemented lens formed of a biconvex lens L24 and a negative meniscus lens L25 with a concave surface on the object side in order from the object side.

The lenses L13 and L16 use a material that satisfies the conditional expression (1).

Both surfaces of the lens L11 are formed aspherical. This causes generation of various types of aberrations, including distortion, to be suppressed, while giving a strong negative refractive power to the first front lens group G11. A higher degree of asphericity allows further correction of distortion, but for a reason to secure a wide effective angle of view inherent to surveillance cameras, the degree of correction is controlled. In a case where the present invention is applied to a digital camera, it is possible to further correct distortion.

With respect to the object side three negative lenses L11 to L13, directing a surface smaller than that of the object side in absolute value of radius of curvature on the image side is advantageous for correcting distortion and astigmatism. The subsequent disposition of the cemented lens formed of the negative lens L14 and the positive lens L15 in order from the object side allows control of higher order chromatic aberrations. The subsequent disposition of the negative meniscus lens L16 with a concave surface on the object side allows spherical aberration to be corrected easily.

The cementing surface of the cemented lens of the first rear lens group G12 has a negative refractive power, thereby having effects of correcting spherical aberration and cancelling Petzval sum which tends to be over-corrected in retrofocus type.

The cementing surface of each of the cemented lenses in the second lens group G2 has a negative refractive power, thereby having effects of correcting spherical aberration and cancelling the Petzval sum which tends to be over-corrected in retrofocus type. The positive lens in each cemented lens has a larger Abbe number than that of the negative lens, thereby having effects of correcting longitudinal chromatic aberration and lateral chromatic aberration.

Basic lens data and specification data of the imaging lens of Example 1 are shown in Tables 1 and 2 respectively. Meanings of the symbols used in the tables will be described below by taking those used in Example 1 as example, but basically the same applies to Examples 2 to 4.

In the lens data in Table 1, the Si column indicates the $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of the $i^{th}$ surface and the Di column indicates the surface distance on the optical axis Z between the $i^{th}$ surface and the $(i+1)^{th}$ surface. The Ndj column indicates the refractive index of the $j^{th}$ optical element with respect to the d-line (wavelength of 587.6 nm) in which a number j (j=1, 2, 3, - - - ) is given to each constituent element in a serially increasing manner toward the image side with the most object side constituent element being taken as the first element, and the vdj column indicates the Abbe number of the $j^{th}$ optical element with respect to the d-line.

The sign of the radius of curvature is positive if the surface shape is convex on the object side and negative if it is convex on the image side. Note that the aperture stop St and the optical member PP are also included in the basic lens data. The surface number column corresponding to the aperture stop St includes the word (Stop) in addition to the surface number.

The specification data in Table 2 show values of focal length f', back focus BF', F-number FNo, and total angle of view 2ω.

In the data of the basic lens data and the specification data, degree is used as the unit of angle, and mm is used as the unit of length. But, these are only examples and other appropriate units may also be used, as optical systems can be used by proportionally enlarged or reduced.

In the lens data in Table 1, the mark "*" is attached to the surface number of an aspherical surface and a numerical value of the paraxial radius of curvature is indicated as the radius of curvature of the aspherical surface. The aspherical surface coefficient data in Table 3 show the surface numbers of aspherical surfaces and aspherical surface coefficients of these aspherical surfaces. The aspherical surface coefficients are the values of each of coefficients KA and Am (m=3, 4, 5, - - - , and 20) in an aspherical surface expression represented by a formula (A) given below:

$$Zd = C \cdot h^2 / \{1 + (1 - KA \cdot C^2 \cdot h^2)^{1/2}\} + \Sigma Am \cdot h^m \quad (A)$$

where,

Zd: depth of aspherical surface (length of vertical line extended from a point on the aspherical surface at height h to a flat surface orthogonal to the optical axis to which the aspherical apex contacts)

h: height (distance from the optical axis)

C: inverse of paraxial radius of curvature

KA, Am: aspherical surface coefficients (m=3, 4, 5, - - - , and 20).

TABLE 1

Example 1•Lens Data

| Si (Surface Number) | Ri (Radius of Curvature) | Di (Surface Distance) | Ndj (Refractive Index) | vdj (Abbe Number) |
|---|---|---|---|---|
| *1 | 1000.00000 | 1.241 | 1.58313 | 59.46 |
| *2 | 13.32820 | 2.631 | | |
| 3 | 12.85096 | 0.802 | 1.61800 | 63.33 |
| 4 | 6.08438 | 3.450 | | |
| 5 | −22.45186 | 0.802 | 1.43875 | 94.93 |
| 6 | 6.08302 | 1.194 | | |
| 7 | 55.36161 | 1.137 | 1.90366 | 31.32 |
| 8 | 5.43700 | 4.102 | 1.73800 | 32.26 |
| 9 | −10.33862 | 0.288 | | |
| 10 | −6.36068 | 1.269 | 1.43875 | 94.93 |
| 11 | −660.73765 | 1.487 | | |
| 12 | 24.84410 | 3.162 | 1.90366 | 31.32 |
| 13 | 5.15100 | 3.581 | 1.64769 | 33.79 |
| 14 | −14.96221 | 0.000 | | |
| 15(Stop) | ∞ | 0.181 | | |
| 16 | 9.40417 | 4.941 | 1.43875 | 94.93 |
| 17 | −9.40417 | 0.171 | | |
| 18 | 28.87657 | 0.811 | 1.88300 | 40.76 |
| 19 | 5.67500 | 4.017 | 1.49700 | 81.54 |
| 20 | −16.30350 | 0.180 | | |
| 21 | 8.75786 | 3.699 | 1.49700 | 81.54 |
| 22 | −10.06200 | 0.801 | 1.90366 | 31.32 |
| 23 | −20.67784 | 0.580 | | |
| 24 | ∞ | 0.090 | 1.51633 | 64.14 |
| 25 | ∞ | 0.550 | | |
| 26 | ∞ | 0.250 | 1.51633 | 64.14 |
| 27 | ∞ | 1.000 | | |
| 28 | ∞ | 0.800 | 1.51633 | 64.14 |
| 29 | ∞ | 2.756 | | |

TABLE 2

Example 1•Specifications (d-line)

| f' | 2.41 |
|---|---|
| Bf' | 5.64 |
| FNo. | 1.86 |
| 2ω[°] | 116.6 |

TABLE 3

Example 1•Aspherical surface Coefficients

| Si | 1 | 2 |
|---|---|---|
| KA | −4.4196974E+01 | 6.1938066E−01 |
| A3 | 0.0000000E+00 | 0.0000000E+00 |
| A4 | 4.7400288E−03 | 5.7738024E−03 |
| A5 | −1.4081537E−03 | −1.6826135E−03 |
| A6 | 1.7195504E−04 | 1.7438106E−04 |
| A7 | −8.5761990E−06 | −6.6888333E−06 |
| A8 | −4.4695152E−08 | 3.6873974E−08 |
| A9 | 1.3075246E−08 | −1.0298212E−09 |
| A10 | 3.3224865E−10 | 5.1736837E−10 |
| A11 | 5.2827768E−11 | 2.0977521E−11 |
| A12 | −1.1292686E−11 | −1.3452757E−11 |
| A13 | 3.3804326E−13 | 4.7614258E−13 |
| A14 | 6.0928103E−15 | 2.4109259E−14 |
| A15 | 3.0462740E−18 | −9.0689692E−19 |

TABLE 3-continued

Example 1•Aspherical surface Coefficients

| Si | 1 | 2 |
|---|---|---|
| A16 | 8.2222957E−19 | −3.3286134E−19 |
| A17 | 1.2548862E−19 | −7.0378569E−20 |
| A18 | 1.1522570E−20 | −1.4790654E−20 |
| A19 | −1.4907651E−22 | −2.7969952E−21 |
| A20 | −3.7432254E−22 | −4.7731322E−22 |

Each aberration diagram of the imaging lens of Example 1 is shown in A to D of FIG. 6. A to D of FIG. 6 show spherical aberration, astigmatism, distortion, and lateral chromatic aberration respectively.

Each of the aberration diagrams representing spherical aberration, astigmatism, and distortion shows aberration with the d-line (wavelength 587.6 nm) as the reference wavelength. The diagram of spherical aberration shows aberrations with respect to the d-line (wavelength 587.6 nm), the C-line (wavelength 656.3 nm), the F-line (wavelength 486.1 nm), and the g-line (wavelength 435.8 nm) by a solid line, a long dashed line, a short dashed line, and a dotted line respectively. The aberration diagram of astigmatism shows aberrations in the sagittal direction and the tangential direction by a solid line and a broken line respectively. The diagram of lateral chromatic aberration shows aberrations with respect to the C-line (wavelength 656.3 nm) and the F-line (wavelength 486.1 nm) by a long broken line and a short broken line respectively. The "FNo." in the diagram of spherical aberration refers to F-number and "w" in the other aberration diagrams refers to half angle of view.

Next, an imaging lens of Example 2 will be described. A cross-sectional view illustrating a lens configuration of the imaging lens of Example 2 is shown in FIG. 2.

The imaging lens of Example 2 has almost the same configuration as that of Example 1 and the effects are also similar, but differs in that the lenses L12 and L13 use a material that satisfies the conditional expression (1). Although the positions at which a low dispersion material is used are different, the similar objective has been achieved by the use of a low dispersion material in the two negative lenses.

Basic lens data, specification data, and aspherical surface coefficient data of the imaging lens of Example 2 are shown in Tables 4, 5, and 6 respectively, and each aberration diagram of the imaging lens of Example 2 is shown in A to D of FIG. 7.

TABLE 4

Example 2•Lens Data

| Si (Surface Number) | Ri (Radius of Curvature) | Di (Surface Distance) | Ndj (Refractive Index) | vdj (Abbe Number) |
|---|---|---|---|---|
| *1 | 1000.00000 | 1.241 | 1.58313 | 59.46 |
| *2 | 13.32820 | 3.132 | | |
| 3 | 16.96276 | 0.802 | 1.49700 | 81.54 |
| 4 | 5.67439 | 3.314 | | |
| 5 | −19.22037 | 0.802 | 1.49700 | 81.54 |
| 6 | 5.94600 | 1.224 | | |
| 7 | 100.51133 | 2.576 | 1.92286 | 18.90 |
| 8 | 9.50400 | 3.400 | 1.80518 | 25.42 |
| 9 | −9.50400 | 0.204 | | |
| 10 | −7.00031 | 2.650 | 1.88300 | 40.76 |
| 11 | −11.32777 | 1.170 | | |
| 12 | 17.37160 | 1.837 | 1.80400 | 46.58 |
| 13 | 4.34800 | 3.270 | 1.60562 | 43.70 |
| 14 | −165.01808 | 1.002 | | |

TABLE 4-continued

Example 2•Lens Data

| Si (Surface Number) | Ri (Radius of Curvature) | Di (Surface Distance) | Ndj (Refractive Index) | νdj (Abbe Number) |
|---|---|---|---|---|
| 15(Stop) | ∞ | 1.511 | | |
| 16 | 10.33944 | 2.882 | 1.49700 | 81.54 |
| 17 | −10.33944 | 0.171 | | |
| 18 | 23.39187 | 0.811 | 1.88300 | 40.76 |
| 19 | 5.49100 | 3.354 | 1.43875 | 94.93 |
| 20 | −12.49280 | 0.171 | | |
| 21 | 8.10572 | 3.732 | 1.43875 | 94.93 |
| 22 | −8.10572 | 0.795 | 1.88300 | 40.76 |
| 23 | −16.19352 | 1.000 | | |
| 24 | ∞ | 0.800 | 1.51633 | 64.14 |
| 25 | ∞ | 3.936 | | |

TABLE 5

Example 2•Specifications (d-line)

| | |
|---|---|
| f | 2.40 |
| Bf | 5.47 |
| FNo. | 1.84 |
| 2ω[°] | 116.4 |

TABLE 6

Example 2•Aspherical surface Coefficients

| Si | 1 | 2 |
|---|---|---|
| KA | −4.4196974E+01 | 6.1938066E−01 |
| A3 | 0.0000000E+00 | 0.0000000E+00 |
| A4 | 4.7400288E−03 | 5.7738024E−03 |
| A5 | −1.4081537E−03 | −1.6826135E−03 |
| A6 | 1.7195504E−04 | 1.7438106E−04 |
| A7 | −8.5761990E−06 | −6.6888333E−06 |
| A8 | −4.4695152E−08 | 3.6873974E−08 |
| A9 | 1.3075246E−08 | −1.0298212E−09 |
| A10 | 3.3224865E−10 | 5.1736837E−10 |
| A11 | 5.2827768E−11 | 2.0977521E−11 |
| A12 | −1.1292686E−11 | −1.3452757E−11 |
| A13 | 3.3804326E−13 | 4.7614258E−13 |
| A14 | 6.0928103E−15 | 2.4109259E−14 |
| A15 | 3.0462740E−18 | −9.0689692E−19 |
| A16 | 8.2222957E−19 | −3.3286134E−19 |
| A17 | 1.2548862E−19 | −7.0378569E−20 |
| A18 | 1.1522570E−20 | −1.4790654E−20 |
| A19 | −1.4907651E−22 | −2.7969952E−21 |
| A20 | −3.7432254E−22 | −4.7731322E−22 |

Next, an imaging lens of Example 3 will be described. A cross-sectional view illustrating a lens configuration of the imaging lens of Example 3 is shown in FIG. 3.

The imaging lens of Example 3 has almost the same configuration as that of Example 2 and the effects are also similar, but differs in that the lenses L11 and L14 are biconcave lenses, each with a surface smaller in absolute value of radius of curvature on the object side. Although the lens L11 is a biconcave lens, there is not a large difference in effects from the case in which a meniscus lens is used, because the object side surface has a large absolute value of radius of curvature. The employment, as the lens L14, of a biconcave lens with a surface smaller in absolute value of radius of curvature on the object side allows the lens to suppress the generation of higher order spherical aberrations while having a certain refractive power. Note that the effects observed in Examples 1 and 2 are small, since the cementing surface with the lens L15 has a large absolute value of radius of curvature.

Basic lens data, specification data, and aspherical surface coefficient data of the imaging lens of Example 3 are shown in Tables 7, 8, and 9 respectively, and each aberration diagram of the imaging lens of Example 3 is shown in A to D of FIG. 8.

TABLE 7

Example 3•Lens Data

| Si (Surface Number) | Ri (Radius of Curvature) | Di (Surface Distance) | Ndj (Refractive Index) | νdj (Abbe Number) |
|---|---|---|---|---|
| *1 | −21474.83648 | 1.686 | 1.58913 | 61.25 |
| *2 | 15.06697 | 2.486 | | |
| 3 | 16.86958 | 0.802 | 1.49700 | 81.54 |
| 4 | 6.13160 | 3.269 | | |
| 5 | −31.54843 | 0.802 | 1.49700 | 81.54 |
| 6 | 5.20574 | 1.660 | | |
| 7 | −52.64058 | 1.751 | 1.92286 | 18.90 |
| 8 | 214.02928 | 3.005 | 1.73800 | 32.26 |
| 9 | −9.47401 | 0.307 | | |
| 10 | −6.22950 | 2.650 | 1.77250 | 49.60 |
| 11 | −10.60708 | 0.916 | | |
| 12 | 19.02998 | 3.416 | 1.80400 | 46.58 |
| 13 | 4.52918 | 3.374 | 1.60562 | 43.70 |
| 14 | −26.55282 | 1.002 | | |
| 15(Stop) | ∞ | 1.001 | | |
| 16 | 9.16758 | 2.700 | 1.49700 | 81.54 |
| 17 | −11.22203 | 0.171 | | |
| 18 | 31.63062 | 0.802 | 1.88300 | 40.76 |
| 19 | 5.45241 | 3.023 | 1.43875 | 94.93 |
| 20 | −13.39980 | 0.171 | | |
| 21 | 8.20567 | 3.625 | 1.43875 | 94.93 |
| 22 | −6.57412 | 0.805 | 1.88300 | 40.76 |
| 23 | −11.73505 | 1.000 | | |
| 24 | ∞ | 0.800 | 1.51633 | 64.14 |
| 25 | ∞ | 3.992 | | |

TABLE 8

Example 3•Specifications (d-line)

| | |
|---|---|
| f | 2.40 |
| Bf | 5.52 |
| FNo. | 1.84 |
| 2ω[°] | 116.4 |

TABLE 9

Example 3•Aspherical surface Coefficients

| Si | 1 | 2 |
|---|---|---|
| KA | −4.4188420E+01 | 6.0950727E−01 |
| A3 | 0.0000000E+00 | 0.0000000E+00 |
| A4 | 2.2215434E−03 | 2.4170077E−03 |
| A5 | −4.6111256E−04 | −3.6420709E−04 |
| A6 | 4.3292428E−05 | 5.4029768E−06 |
| A7 | −1.8490079E−06 | 5.4604440E−07 |
| A8 | −2.7486071E−08 | 4.4332667E−08 |
| A9 | 3.4638401E−09 | −5.3734240E−10 |
| A10 | 3.1042712E−10 | 5.1415518E−10 |
| A11 | 5.4178934E−11 | 1.9357280E−11 |
| A12 | −1.1291210E−11 | −1.3459792E−11 |
| A13 | 3.4480997E−13 | 4.6917769E−13 |
| A14 | 8.3000478E−15 | 2.6923755E−15 |
| A15 | 0.0000000E+00 | 0.0000000E+00 |
| A16 | 0.0000000E+00 | 0.0000000E+00 |

Next, an imaging lens of Example 4 will be described. A cross-sectional view illustrating a lens configuration of the imaging lens of Example 4 is shown in FIG. 4.

The imaging lens of Example 4 has almost the same configuration as that of Example 2 and the effects are also similar with respect to the first lens group G1, but differs in that a cemented lens formed of a negative meniscus lens L21 with a concave surface on the image side and a biconvex lens L22 in order from the object side is disposed on the most object side in the second lens group G2, instead of the lens L21 in Example 2. This is advantageous for correcting longitudinal chromatic aberration. The effects of the subsequent cemented lenses formed of the lenses L23 and L24, and the lenses L25 and L26 respectively are as in the other examples.

Figure 9:
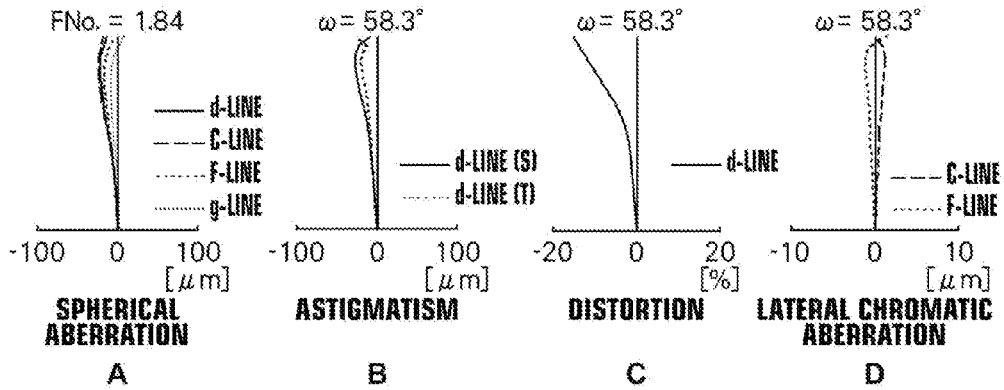
FIG. 9 shows each aberration diagram of imaging lens of Example 4 of the present invention (A to D).

Basic lens data, specification data, and aspherical surface coefficient data of the imaging lens of Example 4 are shown in Tables 10, 11, and 12 respectively, and each aberration diagram of the imaging lens of Example 4 is shown in A to D of FIG. 9.

TABLE 10

Example 4 •Lens Data

| Si (Surface Number) | Ri (Radius of Curvature) | Di (Surface Distance) | Ndj (Refractive Index) | vdj (Abbe Number) |
| --- | --- | --- | --- | --- |
| *1 | 1000.00000 | 1.362 | 1.58913 | 61.25 |
| *2 | 13.53995 | 3.615 | | |
| 3 | 23.41074 | 0.802 | 1.49700 | 81.54 |
| 4 | 5.37140 | 3.189 | | |
| 5 | −17.51861 | 0.802 | 1.49700 | 81.54 |
| 6 | 6.35685 | 0.996 | | |
| 7 | 50.23452 | 0.939 | 1.92286 | 18.90 |
| 8 | 14.30412 | 3.307 | 1.73800 | 32.26 |
| 9 | −8.91804 | 0.252 | | |
| 10 | −6.39941 | 2.650 | 1.77250 | 49.60 |
| 11 | −11.37607 | 1.084 | | |
| 12 | 31.70089 | 3.416 | 1.80400 | 46.58 |
| 13 | 4.95924 | 3.314 | 1.59551 | 39.24 |
| 14 | −25.97540 | 1.002 | | |
| 15(Stop) | ∞ | 0.851 | | |
| 16 | 7.50220 | 0.760 | 1.71299 | 53.87 |
| 17 | 5.16773 | 3.260 | 1.49700 | 81.54 |
| 18 | −11.04697 | 0.171 | | |
| 19 | 21.35610 | 0.802 | 1.88300 | 40.76 |
| 20 | 5.53129 | 2.970 | 1.43875 | 94.93 |
| 21 | −15.82839 | 0.171 | | |
| 22 | 7.75467 | 3.556 | 1.43875 | 94.93 |
| 23 | −7.12964 | 0.810 | 1.88300 | 40.76 |
| 24 | −14.68923 | 1.000 | | |
| 25 | ∞ | 0.800 | 1.51633 | 64.14 |
| 26 | ∞ | 3.998 | | |

TABLE 11

Example 4•Specifications (d-line)

| | |
| --- | --- |
| f | 2.40 |
| Bf | 5.52 |
| FNo. | 1.84 |
| 2ω[°] | 116.6 |

TABLE 12

Example 4•Aspherical surface Coefficients

| Si | 1 | 2 |
| --- | --- | --- |
| KA | −4.4188791E+01 | 6.0782063E−01 |
| A3 | 0.0000000E+00 | 0.0000000E+00 |
| A4 | 3.3444915E−03 | 3.6885237E−03 |
| A5 | −9.6500520E−04 | −9.9882094E−04 |
| A6 | 1.1911617E−04 | 9.7206970E−05 |
| A7 | −6.0616494E−06 | −3.6347312E−06 |
| A8 | −5.0307060E−08 | 3.8176255E−08 |
| A9 | 1.0926306E−08 | −7.3667705E−10 |

TABLE 12-continued

Example 4•Aspherical surface Coefficients

| Si | 1 | 2 |
| --- | --- | --- |
| A10 | 3.3164664E−10 | 5.1752922E−10 |
| A11 | 5.3416634E−11 | 2.0885563E−11 |
| A12 | −1.1291363E−11 | −1.3452948E−11 |
| A13 | 3.3818303E−13 | 4.7610892E−13 |
| A14 | 5.7473170E−15 | 1.2443537E−14 |
| A15 | 0.0000000E+00 | 0.0000000E+00 |
| A16 | 0.0000000E+00 | 0.0000000E+00 |
| A17 | 0.0000000E+00 | 0.0000000E+00 |
| A18 | 0.0000000E+00 | 0.0000000E+00 |
| A19 | 0.0000000E+00 | 0.0000000E+00 |
| A20 | 0.0000000E+00 | 0.0000000E+00 |

Next, an imaging lens of Example 5 will be described. A cross-sectional view illustrating a lens configuration of the imaging lens of Example 5 is shown in FIG. 5.

The imaging lens of Example 5 consists of a first lens group G1, an aperture stop St, and a second lens group G2 having a positive refractive power, in order from the object side.

The first lens group G1 is composed of a first front lens group G11 having a negative refractive power and a first rear lens group G12 having a positive refractive power, in order from the object side. The first front lens group G11 is composed, in order from the object side, of a negative meniscus lens L11 with a concave surface on the image side, a negative meniscus lens L12 with a concave surface on the image side, a biconcave lens L13 with a surface smaller than that of the object side in absolute value of radius of curvature on the image side, and a cemented lens formed of a negative meniscus lens L14 with a concave surface on the image side and a biconvex lens L15 in order from the object side. The first rear lens group G12 is composed of a cemented lens formed of a negative meniscus lens L16 with a concave surface on the image side and a biconvex lens L17 in order from the object side.

The second lens group G2 is composed, in order from the object side, of a biconvex lens L21, a cemented lens formed of a negative meniscus lens L22 with a concave surface on the image side and a biconvex lens L23 in order from the object side, and a cemented lens formed of a biconvex lens L24 and a negative meniscus lens L25 with a concave surface on the object side in order from the object side.

The lenses L13 and L14 use a material that satisfies the conditional expression (1).

Both surfaces of the lens L11 are formed aspherical. This allows generation of various types of aberrations, including distortion, to be suppressed, while giving a strong negative refractive power to the first front lens group G11, thereby allowing the present invention to be applied to digital cameras.

With respect to the object side three negative lenses L11 to L13, directing a surface smaller than that of the object side in absolute value of radius of curvature on the image side is advantageous for correcting distortion and astigmatism. The subsequent disposition of the cemented lens formed of the negative lens L14 and the positive lens L15 in order from the object side allows control of higher order spherical aberrations.

The cementing surface of the cemented lens formed of the first rear lens group G12 has a negative refractive power, thereby having effects of correcting spherical aberration and cancelling Petzval sum which tends to be over-corrected in retrofocus type.

Both surfaces of the lens L21 in the second lens group are formed aspherical. This has an effect of correcting spherical aberration and the lens L16 in Example 1 is successfully eliminated.

The cementing surface of each of the cemented lenses in the second lens group G2 has a negative refractive power, thereby having effects of correcting spherical aberration and cancelling the Petzval sum which tends to be over-corrected in retrofocus type. The positive lens in each cemented lens has a larger Abbe number than that of the negative lens, thereby having effects of correcting longitudinal chromatic aberration and lateral chromatic aberration.

Figure 10:
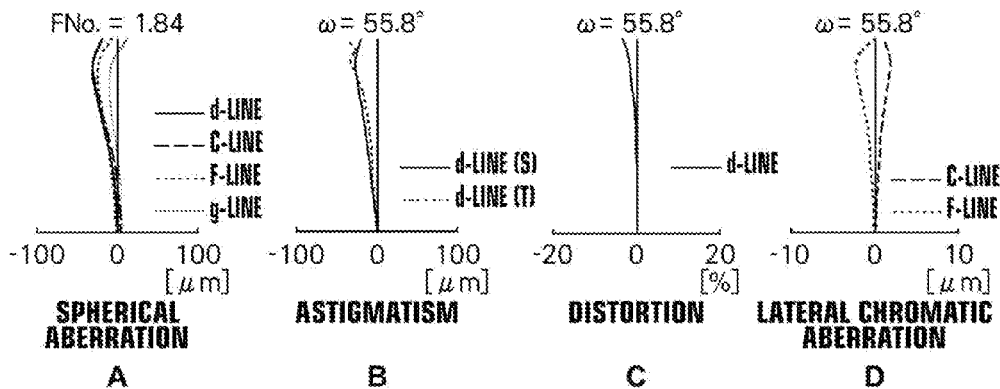
FIG. 10 shows each aberration diagram of imaging lens of Example 5 of the present invention (A to D).

Basic lens data, specification data, and aspherical surface coefficient data of the imaging lens of Example 5 are shown in Tables 13, 14, and 15 respectively, and each aberration diagram of the imaging lens of Example 5 is shown in A to D of FIG. 10.

TABLE 13

Example 5 • Lens Data

| Si (Surface Number) | Ri (Radius of Curvature) | Di (Surface Distance) | Ndj (Refractive Index) | vdj (Abbe Number) |
|---|---|---|---|---|
| *1 | 40.36840 | 0.900 | 1.76802 | 49.24 |
| *2 | 9.88450 | 5.562 | | |
| 3 | 14.54922 | 2.102 | 1.85026 | 32.27 |
| 4 | 4.76284 | 3.263 | | |
| 5 | −14.40439 | 0.919 | 1.43875 | 94.93 |
| 6 | 7.17813 | 1.203 | | |
| 7 | 370.36612 | 0.810 | 1.43875 | 94.93 |
| 8 | 6.21441 | 3.800 | 1.57501 | 41.50 |
| 9 | −16.16775 | 0.200 | | |
| 10 | 11.89219 | 5.409 | 1.84666 | 23.78 |
| 11 | 4.67295 | 3.221 | 1.63980 | 34.46 |
| 12 | −40.07584 | 1.000 | | |
| 13(Stop) | ∞ | 0.946 | | |
| *14 | 16.72395 | 2.108 | 1.60300 | 65.44 |
| *15 | −23.88344 | 1.025 | | |
| 16 | 42.02299 | 1.001 | 1.88300 | 40.76 |
| 17 | 5.78192 | 2.684 | 1.43875 | 94.93 |
| 18 | −8.62362 | 0.200 | | |
| 19 | 8.28735 | 3.366 | 1.43875 | 94.93 |
| 20 | −6.28601 | 0.980 | 1.84666 | 23.78 |
| 21 | −8.42547 | 1.000 | | |
| 22 | ∞ | 0.800 | 1.51633 | 64.14 |
| 23 | ∞ | 4.001 | | |

TABLE 14

Example 5•Specifications (d-line)

| | |
|---|---|
| f | 2.32 |
| Bf | 5.53 |
| FNo. | 1.84 |
| 2ω[°] | 111.6 |

TABLE 15

Example 5•Aspherical surface Coefficients

| Si | 1 | 2 |
|---|---|---|
| KA | 1.0000000E+00 | 1.0000000E+00 |
| A3 | 0.0000000E+00 | 0.0000000E+00 |
| A4 | 1.4996610E−03 | 1.4055821E−03 |
| A5 | −2.7219255E−04 | −1.9927800E−04 |
| A6 | 1.8434531E−05 | 3.8616484E−06 |
| A7 | −2.8435061E−07 | 4.9469469E−07 |
| A8 | −1.0643544E−09 | −1.8386387E−09 |
| A9 | −7.1264967E−10 | 2.7777953E−10 |
| A10 | 1.5341078E−11 | 1.0095603E−10 |
| A11 | 3.8327523E−12 | 5.1860189E−12 |
| A12 | −6.5462697E−13 | 8.5093318E−13 |
| A13 | −5.2170476E−15 | −1.5275724E−14 |
| A14 | 3.5259154E−15 | −1.6505980E−14 |
| A15 | 0.0000000E+00 | 0.0000000E+00 |
| A16 | 0.0000000E+00 | 0.0000000E+00 |

| Si | 14 | 15 |
|---|---|---|
| KA | 1.0000000E+00 | 1.0000000E+00 |
| A4 | 2.0982745E−04 | 3.0652946E−04 |
| A6 | −7.7241588E−06 | −1.9379868E−05 |
| A8 | 3.2533896E−07 | 8.2026333E−07 |
| A10 | −2.9576025E−08 | −1.9027027E−08 |
| A12 | −1.0590043E−10 | −5.1944177E−11 |
| A14 | 0.0000000E+00 | 0.0000000E+00 |
| A16 | 0.0000000E+00 | 0.0000000E+00 |
| A18 | 0.0000000E+00 | 0.0000000E+00 |
| A20 | 0.0000000E+00 | 0.0000000E+00 |

Values of the imaging lenses of Example 1 to 5 corresponding to the conditional expressions (1) to (5) are shown in Table 16. Note that each example uses the d-line as the reference wavelength, and the values shown in Table 16 below are those with respect to the reference wavelength.

TABLE 16

| Expression Number | Conditional Expression | Example 1 | Example 2 | Example 3 | Example 4 | Example 5 |
|---|---|---|---|---|---|---|
| (1) | vd1n | 94.93 | 81.54 | 81.54 | 81.54 | 94.93 |
| | | (L13) | (L12) | (L12) | (L12) | (L13) |
| | | 94.93 | 81.54 | 81.54 | 81.54 | 94.93 |
| | | (L16) | (L13) | (L13) | (L13) | (L14) |
| (2) | Δvd2C | 40.78 | 54.17 | 54.17 | 54.17 | 54.17 |
| | | (L23-L22) | (L23-L22) | (L23-L22) | (L24-L23) | (L23-L22) |
| | | 50.22 | 54.17 | 54.17 | 54.17 | 71.15 |
| | | (L24-L25) | (L24-L25) | (L24-L25) | (L25-L26) | (L24-L25) |
| (3) | ΔN2C | 0.386 | 0.44425 | 0.44425 | 0.44425 | 0.44425 |
| | | (L22-L23) | (L22-L23) | (L22-L23) | (L23-L24) | (L22-L23) |
| | | 0.40666 | 0.44425 | 0.44425 | 0.44425 | 0.40791 |
| | | (L25-L24) | (L25-L24) | (L25-L24) | (L26-L25) | (L25-L24) |
| (4) | T12/f | 2.79260 | 2.12848 | 2.82653 | 2.80485 | 3.71899 |
| (5) | f2/f1 | −1.25037 | −1.07571 | −0.84668 | −1.25389 | −0.33890 |

The foregoing data show that all of the imaging lenses of Examples 1 to 5 satisfy conditional expressions (1) to (5) and are bright imaging lenses with satisfactorily corrected aberrations.

Figure 11:
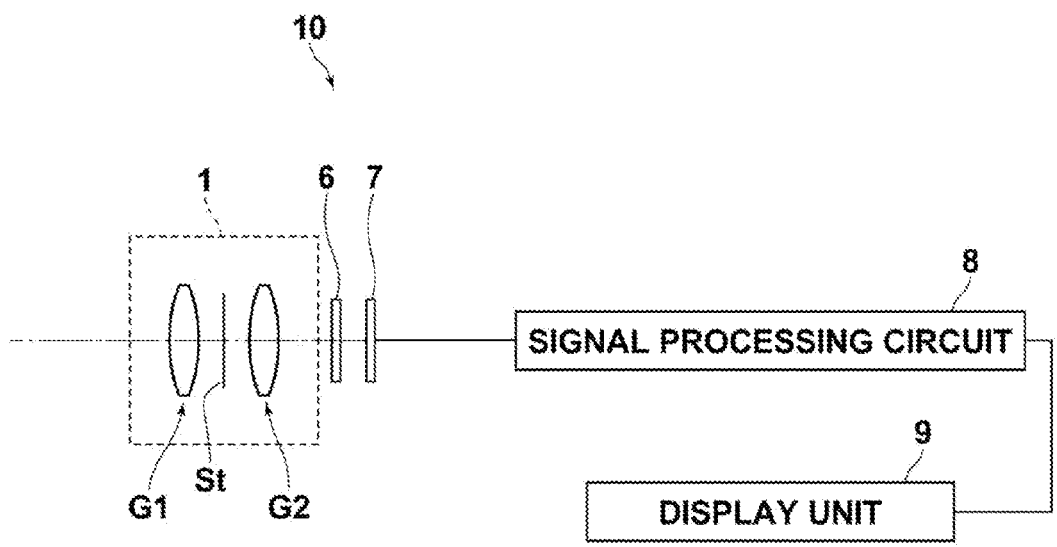
FIG. 11 shows a schematic configuration diagram of an imaging apparatus that uses an imaging lens according to an embodiment of the present invention.

Next, an imaging apparatus according to an embodiment of the present invention will be described. As an example of imaging apparatus according to an embodiment of the present invention, a schematic configuration diagram of an imaging apparatus that uses an imaging lens according to an embodiment of the present invention is shown in FIG. 11. Note that each lens group is depicted schematically in FIG. 11. The foregoing imaging apparatus may be, for example, a video camera, an electronic still camera, or the like, that uses a solid-state image sensor, such as a CCD, a CMOS, or the like as the recording medium.

The imaging apparatus 10 illustrated in FIG. 11 includes an imaging lens 1, a filter 6 having a low-pass filter function or the like disposed on the image side of the imaging lens 1, an image sensor 7 disposed on the image side of the filter 6, and a signal processing circuit 8. The image sensor 7 converts an optical image formed by the imaging lens 1 to an electrical signal and, for example, a CCD (Charge Coupled Device), a CMOS (Complementary Metal Oxide Semiconductor), or the like may be used as the image sensor 7. The image sensor 7 is disposed such that the imaging surface of the image sensor corresponds to the image plane.

The image formed by the imaging lens 1 is focused on the imaging surface of the image sensor 7 and an output signal from the image sensor related to the image is subjected to arithmetic processing by the signal processing circuit 8, whereby an image is displayed on a display unit 9.

So far, the present invention has been described by way of embodiments and examples, but the present invention is not limited to the foregoing embodiments and examples, and various modifications may be made. For example, values of radius of curvature of each lens component, surface distance, refractive index, Abbe number, and the like are not limited to those shown in each numerical example described above and may take other values.

What is claimed is:

1. An imaging lens, consisting of a first lens group, a stop, and a second lens group having a positive refractive power, in order from the object side, wherein:
    the first lens group is composed of a first front lens group having a negative refractive power and a first rear lens group having a positive refractive power, in order from the object side;
    the first front lens group at least includes four negative lenses and at least two of the negative lenses included in the first front lens group satisfy a conditional expression (1) given below; and
    the first rear lens group is composed of a cemented lens formed of a negative lens and a positive lens and satisfies a conditional expression (4) given below:

$$70 < vd1n \quad (1)$$

$$1.5 < T12/f < 5 \quad (4)$$

where,
    vd1n: Abbe number of the lens concerned with respect to the d-line,
    T12: thickness of the first rear lens group on the optical axis, and
    f: focal length of the entire system.

2. An imaging lens, consisting of a first lens group, a stop, and a second lens group having a positive refractive power, in order from the object side, wherein:
    the first lens group is composed of a first front lens group having a negative refractive power and a first rear lens group having a positive refractive power, in order from the object side;
    the first front lens group is composed, in order from the object side, of three negative lenses, each with a surface smaller than that of the object side in absolute value of radius of curvature on the image side, and a cemented lens formed of a negative lens and a positive lens in order from the object side, and at least two of the negative lenses included in the first front lens group satisfy a conditional expression (1) given below;
    the first rear lens group is composed of a cemented lens formed of a negative lens and a positive lens; and
    at least one surface of the most object side lens in the second lens group is aspherical:

$$70 < vd1n \quad (1)$$

where,
    vd1n: Abbe number of the lens concerned with respect to the d-line.

3. The imaging lens of claim 1, wherein the second lens group comprises two pairs of cemented lenses adjacently disposed in order from the most image side, each being formed of a negative lens and a positive lens, and each cemented lens satisfies a conditional expression given below:

$$35 < \Delta vd2c \quad (2)$$

where,
    Δvd2c: difference in Abbe number between the positive and negative lenses forming the cemented lens (Abbe number of the positive lens−Abbe number of the negative lens).

4. The imaging lens of claim 1, wherein the second lens group comprises at least two pairs of cemented lenses, each pair being formed of a negative lens and a positive lens, and each cemented lens satisfies a conditional expression given below:

$$0.35 < \Delta N2C \quad (3)$$

where,
    ΔN2C: difference in refractive index between the negative and positive lenses forming the cemented lens with respect to the d-line (refractive index of the negative lens−refractive index of the positive lens).

5. The imaging lens of claim 1, wherein the imaging lens satisfies a conditional expression given below:

$$-2 < f2/f1 < 0 \quad (5)$$

where,
    f1: focal length of the first lens group, and
    f2: focal length of the second lens group.

6. The imaging lens of claim 1, wherein both surfaces of the most object side lens in the first front lens group are aspherical.

7. The imaging lens of claim 1, wherein the first front lens group is composed of three negative lenses, each with a surface smaller than that of the object side in absolute value of radius of curvature on the image side, a cemented lens formed of a negative lens and a positive lens in order from the object side, and a negative meniscus lens with a concave surface on the object side, in order from the object side.

8. The imaging lens of claim 1, wherein the imaging lens satisfies a conditional expression given below:

$$80 < vd1n \quad (1\text{-}1)$$

9. The imaging lens of claim 1, wherein the second lens group comprises two pairs of cemented lenses adjacently disposed in order from the most image side, each being formed of a negative lens and a positive lens, and each cemented lens satisfies a conditional expression given below:

$$40 < \Delta vd2c \quad (2\text{-}1)$$

where,
Δvd2c: difference in Abbe number between the positive and negative lenses forming the cemented lens (Abbe number of the positive lens−Abbe number of the negative lens).

10. The imaging lens of claim 1, wherein the second lens group comprises at least two pairs of cemented lenses, each being formed of a negative lens and a positive lens, and each cemented lens satisfies a conditional expression given below:

$$0.38 < \Delta N2C \quad (3\text{-}1)$$

where,
ΔN2C: difference in refractive index between the negative and positive lenses forming the cemented lens with respect to the d-line (refractive index of the negative lens−refractive index of the positive lens).

11. The imaging lens of claim 1, wherein the first rear lens group satisfies a conditional expression given below:

$$2 < T12/f < 4.5 \quad (4\text{-}1)$$

where,
T12: thickness of the first rear lens group on the optical axis, and
f: focal length of the entire system.

12. The imaging lens of claim 1, wherein the imaging lens satisfies a conditional expression given below:

$$-1.5 < f2/f1 < 0 \quad (5\text{-}1)$$

where,
f1: focal length of the first lens group, and
f2: focal length of the second lens group.

13. The imaging lens of claim 2, wherein the second lens group comprises two pairs of cemented lenses adjacently disposed in order from the most image side, each being formed of a negative lens and a positive lens, and each cemented lens satisfies a conditional expression given below:

$$35 < \Delta vd2c \quad (2)$$

where,
Δvd2c: difference in Abbe number between the positive and negative lenses forming the cemented lens (Abbe number of the positive lens−Abbe number of the negative lens).

14. The imaging lens of claim 2, wherein the second lens group comprises at least two pairs of cemented lenses, each pair being formed of a negative lens and a positive lens, and each cemented lens satisfies a conditional expression given below:

$$0.35 < \Delta N2C \quad (3)$$

where,
ΔN2C: difference in refractive index between the negative and positive lenses forming the cemented lens with respect to the d-line (refractive index of the negative lens−refractive index of the positive lens).

15. The imaging lens of claim 2, wherein the imaging lens satisfies a conditional expression given below:

$$-2 < f2/f1 < 0 \quad (5)$$

where,
f1: focal length of the first lens group, and
f2: focal length of the second lens group.

16. The imaging lens of claim 2, wherein both surfaces of the most object side lens in the first front lens group are aspherical.

17. The imaging lens of claim 2, wherein the imaging lens satisfies a conditional expression given below:

$$80 < vd1n \quad (1\text{-}1).$$

18. The imaging lens of claim 2, wherein the second lens group comprises two pairs of cemented lenses adjacently disposed in order from the most image side, each being formed of a negative lens and a positive lens, and each cemented lens satisfies a conditional expression given below:

$$40 < \Delta vd2c \quad (2\text{-}1)$$

where,
Δvd2c: difference in Abbe number between the positive and negative lenses forming the cemented lens (Abbe number of the positive lens−Abbe number of the negative lens).

19. An imaging apparatus equipped with the imaging lens of claim 1.

20. An imaging apparatus equipped with the imaging lens of claim 2.

* * * * *